United States Patent
Kim et al.

(10) Patent No.: US 11,113,532 B2
(45) Date of Patent: Sep. 7, 2021

(54) ARTIFICIAL INTELLIGENCE APPARATUS FOR RECOGNIZING OBJECT AND METHOD THEREFOR

(71) Applicant: LG ELECTRONICS INC., Seoul (KR)

(72) Inventors: Jaehong Kim, Seoul (KR); Heeyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 16/493,700

(22) PCT Filed: Apr. 16, 2019

(86) PCT No.: PCT/KR2019/004547
§ 371 (c)(1),
(2) Date: Sep. 12, 2019

(87) PCT Pub. No.: WO2020/213750
PCT Pub. Date: Oct. 22, 2020

(65) Prior Publication Data
US 2020/0042796 A1    Feb. 6, 2020

(51) Int. Cl.
*G06K 9/00* (2006.01)
*G06K 9/62* (2006.01)
(Continued)

(52) U.S. Cl.
CPC ....... *G06K 9/00684* (2013.01); *G06K 9/6257* (2013.01); *G06K 9/6267* (2013.01);
(Continued)

(58) Field of Classification Search
CPC ........... G06K 9/00684; G06K 9/00624; G06K 9/6257; G06K 9/6267; G06N 20/00; G06N 3/082; G06N 3/0454
See application file for complete search history.

(56) References Cited

U.S. PATENT DOCUMENTS

| 7,471,832 B2 | 12/2008 | Luo et al. |
| 2005/0185845 A1 | 8/2005 | Luo et al. |

(Continued)

FOREIGN PATENT DOCUMENTS

| KR | 1020160035765 | 4/2016 |
| KR | 1020180049786 | 5/2018 |

(Continued)

OTHER PUBLICATIONS

PCT International Application No. PCT/KR2019/004547, Written Opinion of the International Searching Authority dated Jan. 16, 2020, 6 pages.

*Primary Examiner* — Casey L Kretzer
(74) *Attorney, Agent, or Firm* — Lee, Hong, Degerman, Kang & Waimey

(57) ABSTRACT

Disclosed herein is an artificial intelligence apparatus for recognizing at least one object, comprising: a memory configured to store a plurality of recognition models for generating identification information corresponding to the object from image data; and a processor configured to: obtain image data for the object, generate first identification information corresponding to the object from the image data using a default recognition model composed of at least one or more of the plurality of recognition models, measure a confidence level for the first identification information, obtain the first identification information as a recognition result of the object if the confidence level is equal to or greater than a first reference value, and obtain second identification information corresponding to the object from the image data as a recognition result of the object using a compound recognition model composed of at least one or more of the plurality of recognition models if the measured confidence level is less than the first reference value, wherein the default recognition model is a model defined by first weights for the plurality of recognition models, and (Continued)

wherein the compound recognition model is a model defined by second weights for the plurality of recognition models.

13 Claims, 15 Drawing Sheets

(51) Int. Cl.
  *G06N 20/00* (2019.01)
  *G06N 3/04* (2006.01)
  *G06N 3/08* (2006.01)
(52) U.S. Cl.
  CPC ........... *G06N 3/0454* (2013.01); *G06N 3/082* (2013.01); *G06N 20/00* (2019.01)

(56) References Cited

U.S. PATENT DOCUMENTS

| | | | |
|---|---|---|---|
| 2016/0163029 A1* | 6/2016 | Gibbon | G06K 9/00288 382/190 |
| 2018/0121732 A1 | 5/2018 | Kim et al. | |
| 2019/0332848 A1* | 10/2019 | Padmanabhan | G06K 9/00228 |

FOREIGN PATENT DOCUMENTS

| | | |
|---|---|---|
| KR | 101900237 | 9/2018 |
| KR | 1020180107988 | 10/2018 |
| KR | 101945487 | 2/2019 |

* cited by examiner

FIG. 6
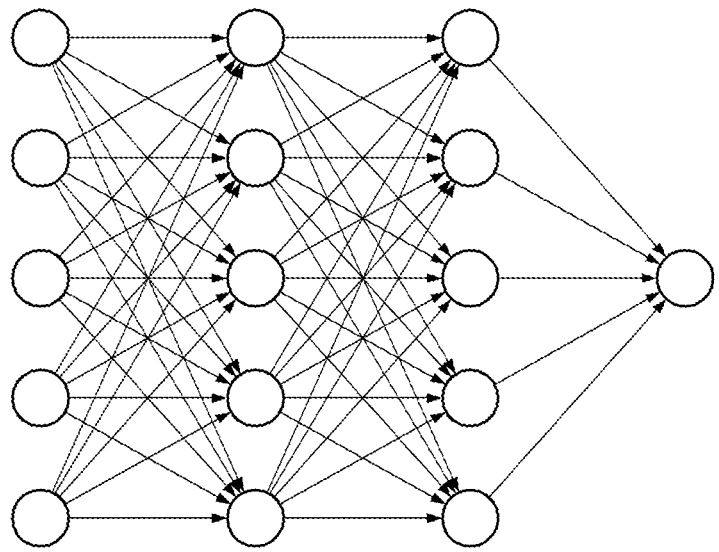
(a)
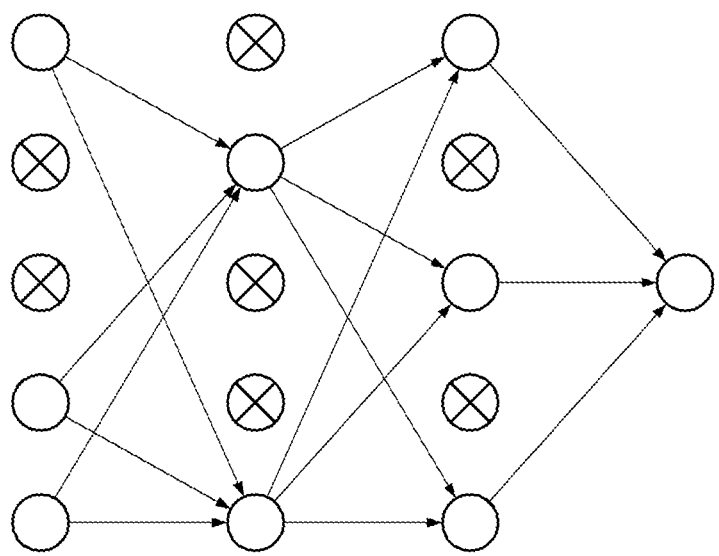
(b)

FIG. 12

| Focus operator | Abbr. | Focus operator | Abbr. |
|---|---|---|---|
| Gradient energy | GRA2 | Gray-level variance | STA3 |
| Gaussian derivative | GRA1 | Gray-level local variance | STA4 |
| Thresholded absolute gradient | GRA3 | Normalized gray-level variance | STA5 |
| Squared gradient | GRA4 | Modifiedgray-level variance | STA6 |
| 3D gradient | GRA5 | Histogram entropy | STA7 |
| Tenengrad | GRA6 | Histogram range | STA8 |
| Tenengrad variance | GRA7 | DCT energy ratio | DCT1 |
| Energy of Laplacian | LAP1 | DCT reduced energy ratio | DCT2 |
| Modified Laplacian | LAP2 | Modified DCT | DCT3 |
| Diagonal Laplacian | LAP3 | Absolute central moment | MIS1 |
| Variance of Laplacian | LAP4 | Brenner's measure | MIS2 |
| Laplacian in 3D window | LAP5 | Image contrast | MIS3 |
| Sum of wavelet coefficients | WAV1 | Image curvature | MIS4 |
| Variance of wavelet coefficients | WAV2 | Hemli and Scherer's mean | MIS5 |
| Ratio of the wavelet coefficients | WAV3 | Local Binary Patterns-based | MIS6 |
| Ratio of curvelet coefficients | WAV4 | Steerable filters-based | MIS7 |
| Chebyshev moments-based | STA1 | Spatial frequency measure | MIS8 |
| Eigenvalues-based | STA2 | Vollath's autocorrelation | MIS9 |

FIG. 13
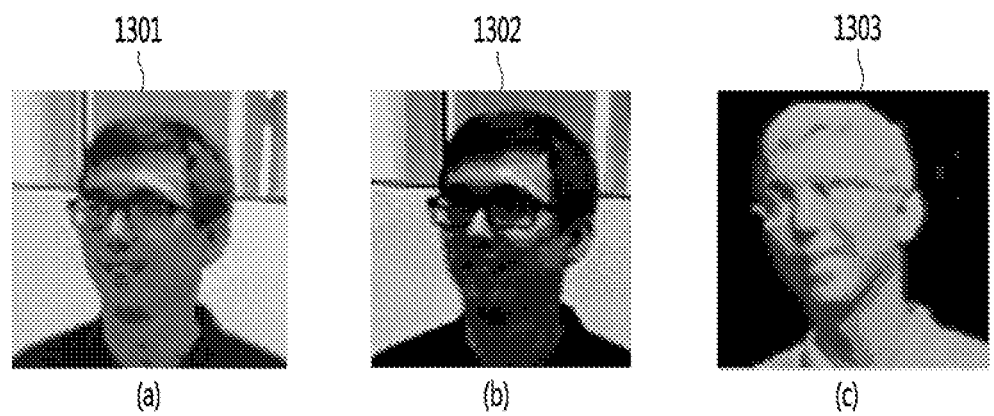
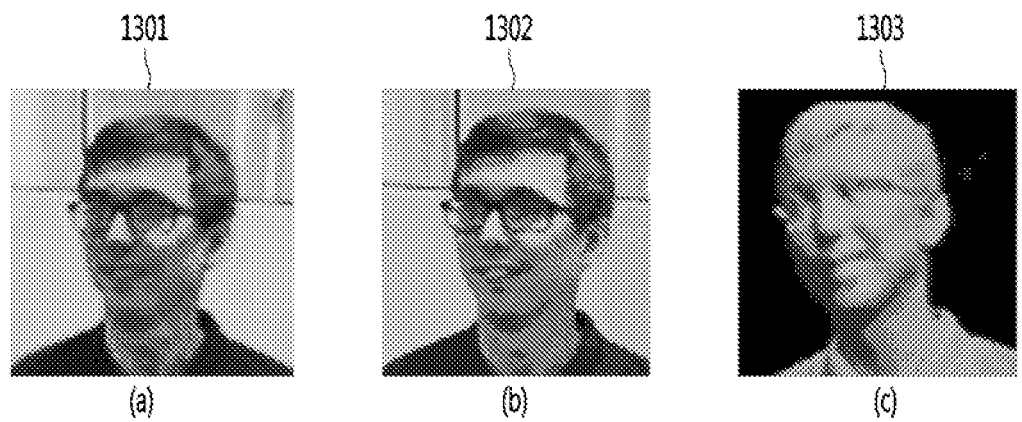

ARTIFICIAL INTELLIGENCE APPARATUS FOR RECOGNIZING OBJECT AND METHOD THEREFOR

CROSS-REFERENCE TO RELATED APPLICATIONS

This application is the National Stage filing under 35 U.S.C. 371 of International Application No. PCT/KR2019/004547, filed on Apr. 16, 2019, the contents of which are hereby incorporated by reference herein in its entirety.

BACKGROUND OF THE INVENTION

1. Field of the Invention

The present invention relates to an artificial intelligence device and a method for recognizing an object. More specifically, the present invention relates to an artificial intelligence apparatus and a method for more accurately recognizing and identifying an object by combining recognition models suitable for input image data using a plurality of recognition models for recognizing an object from image data.

2. Discussion of the Related Art

Recently, a number of devices that perform control by receiving images or sound are increasing. The autonomous vehicle recognizes and analyzes input data to control movement suitable for a situation. Smartphones or security devices receive images, sounds, or the like to determine whether a user is a registered user. Devices with a speech recognition function recognize and analyze speech and perform control suitable for the intention of the speech.

However, current image recognition technology allows only one recognition model to be learned and recognizes an object in image data using only the learned recognition model. Even through the object is recognized in the image data, it is hard to identify how accurately the object is recognized, and even when the object is incorrectly recognized, there is no way to improve it.

Therefore, there is a need for a technique for measuring confidence level when an object is recognized from image data, and when the confidence level is low, increasing the confidence level to recognize the object.

PRIOR ART

Patent Document

Korean Registered Patent No. 10-1945487

SUMMARY OF THE INVENTION

The present invention provides an artificial intelligence apparatus and a method for attempting recognition of an object using a default recognition model, determining a confidence level of the recognition, and recognizing the object with high accuracy using a compound recognition model capable of improving the confidence level when the confidence level of the recognition is low.

The present invention also provides an artificial intelligence apparatus and a method for recognizing an object with a high confidence level even for image data of various environments or various image types.

An embodiment of the present invention provides an artificial intelligence apparatus and a method therefor. The artificial intelligence apparatus may generate identification information corresponding to an object included in image data using a default recognition model, measure a confidence level for the generated identification information, obtain the generated identification information as a recognition result for the object when the confidence level is high, extract an image feature vector from the image data and construct a compound recognition model suitable for the image data when the confidence level is low, and obtain identification information corresponding to the object included in the image data, which is generated using the constructed compound recognition model, as a recognition result for the object.

Further, an embodiment of the present invention provides an artificial intelligence apparatus and a method therefor. The artificial intelligence apparatus may construct a compound recognition model by including one or more of a plurality of recognition models learned with a plurality of image data sets classified into at least one of environment information and an image type and generate identification information for an object using weights of the recognition models constituting the compound recognition model.

According to the various embodiments of the present disclosure, when identification information is generated by recognizing an object in image data, whether a confidence level of the identification information is high may be determined in advance, and when the confidence level is low, the object is recognized using a compound recognition model suitable for the features of the image data, thereby recognizing an object with high accuracy even for image data photographed in various environments.

In addition, according to the various embodiments of the present invention, since recognition models have different confidence levels of object recognition with respect to different environment information or different image types, it is possible to generate identification information more accurately with respect to an object by increasing a weight of a recognition model suitable for given image data.

BRIEF DESCRIPTION OF THE DRAWINGS

FIG. 4 is a view illustrating an example of a color filter format of RGB image data according to an embodiment of the present invention.

FIG. 5 is a view illustrating an example of a color filter format of RGB-IR image data according to an embodiment of the present invention.

FIG. 6 is a view illustrating a dropout technique in an artificial neural network.

FIG. 12 is a view illustrating an example of image features included in an image feature vector, according to an embodiment of the present invention.

FIG. 13 is a view illustrating an example of image data according to an embodiment of the present invention.

DETAILED DESCRIPTION OF THE PREFERRED EMBODIMENTS

Figure 1:
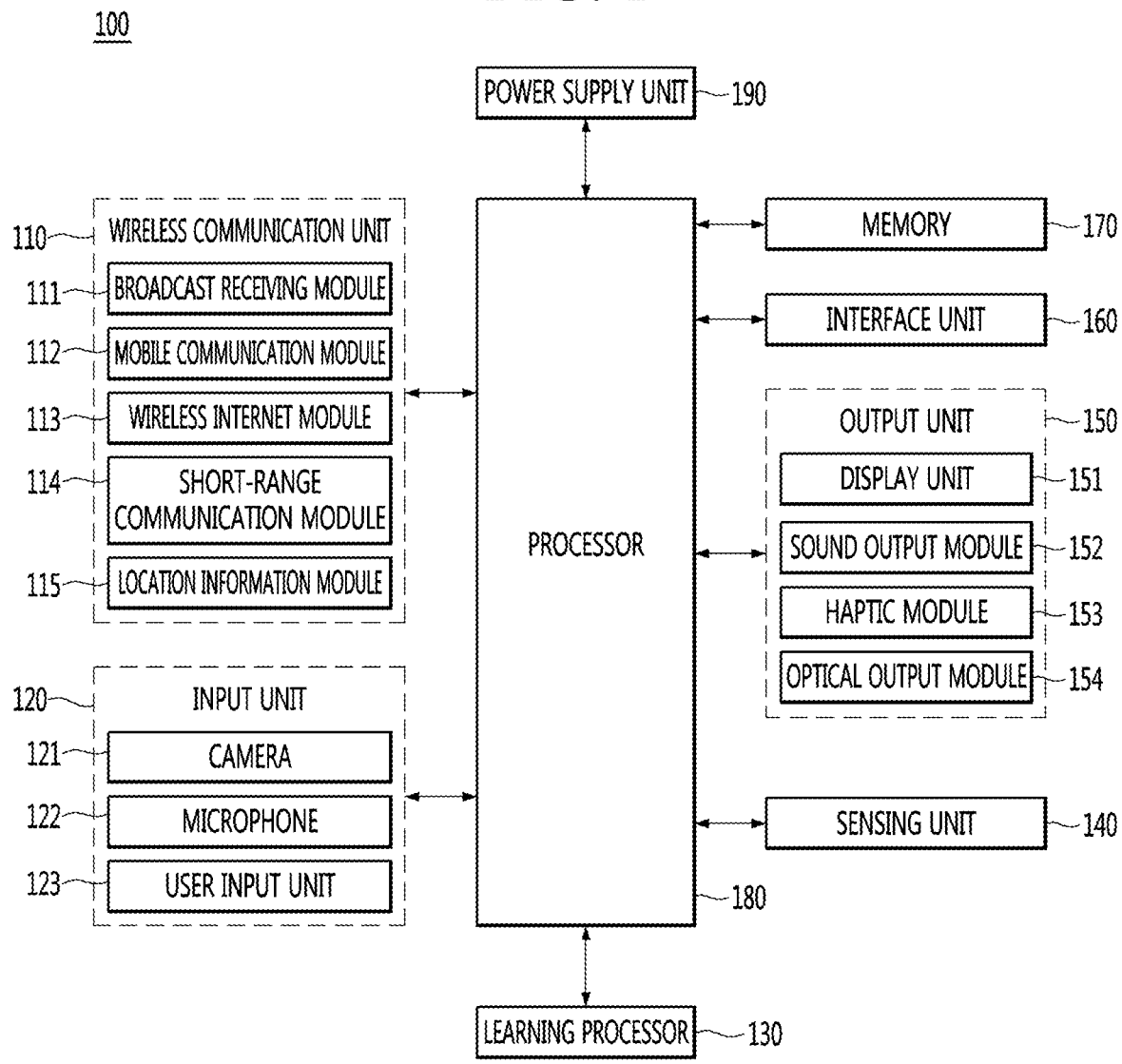
FIG. 1 is a block diagram illustrating a configuration of a terminal according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of a terminal 100 according to an embodiment of the present invention.

Hereinafter, the terminal 100 may be referred to as an artificial intelligence apparatus 100.

The terminal 100 may be implemented for a TV, a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal device 100 may be implemented as various appliances that are used at home, and may be applied to a fixed or movable robot.

The terminal device 100 can perform a function of a voice agent. The voice agent may be a program that recognizes voice of a user and output a response suitable for the recognized user's voice using voice.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model composed of the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technology, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
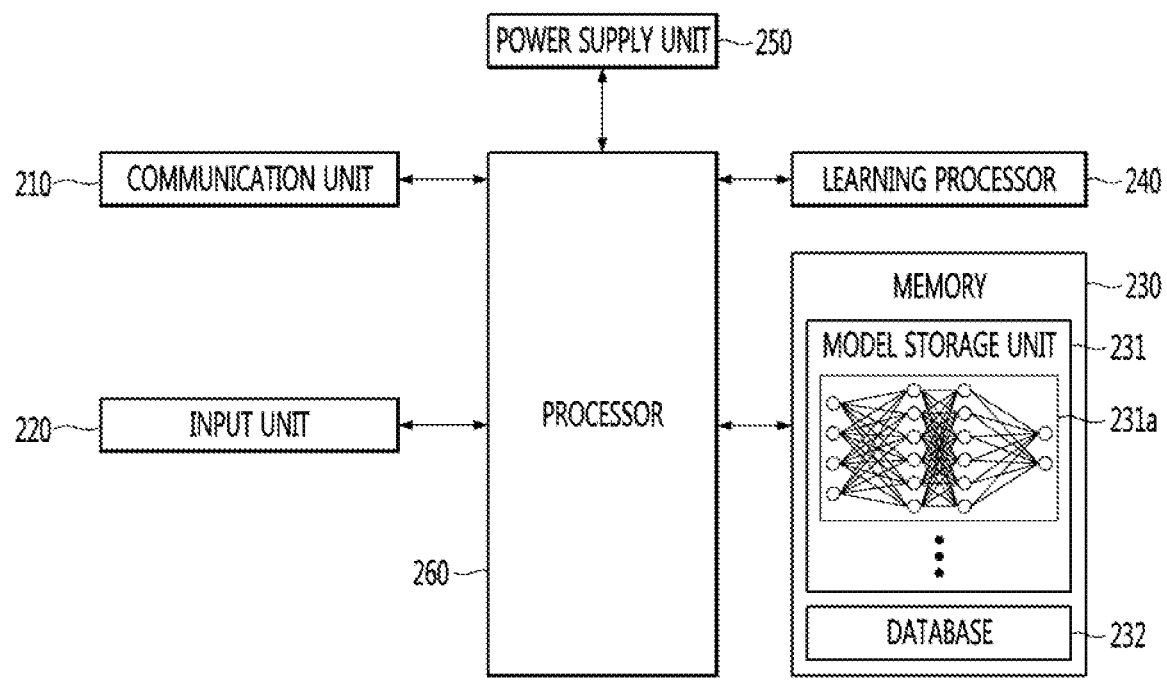
FIG. 2 is a block diagram illustrating a configuration of a learning device of an artificial neural network according to an embodiment of the present invention.

FIG. 2 is a block diagram illustrating a configuration of a learning device 200 of an artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Figure 3:
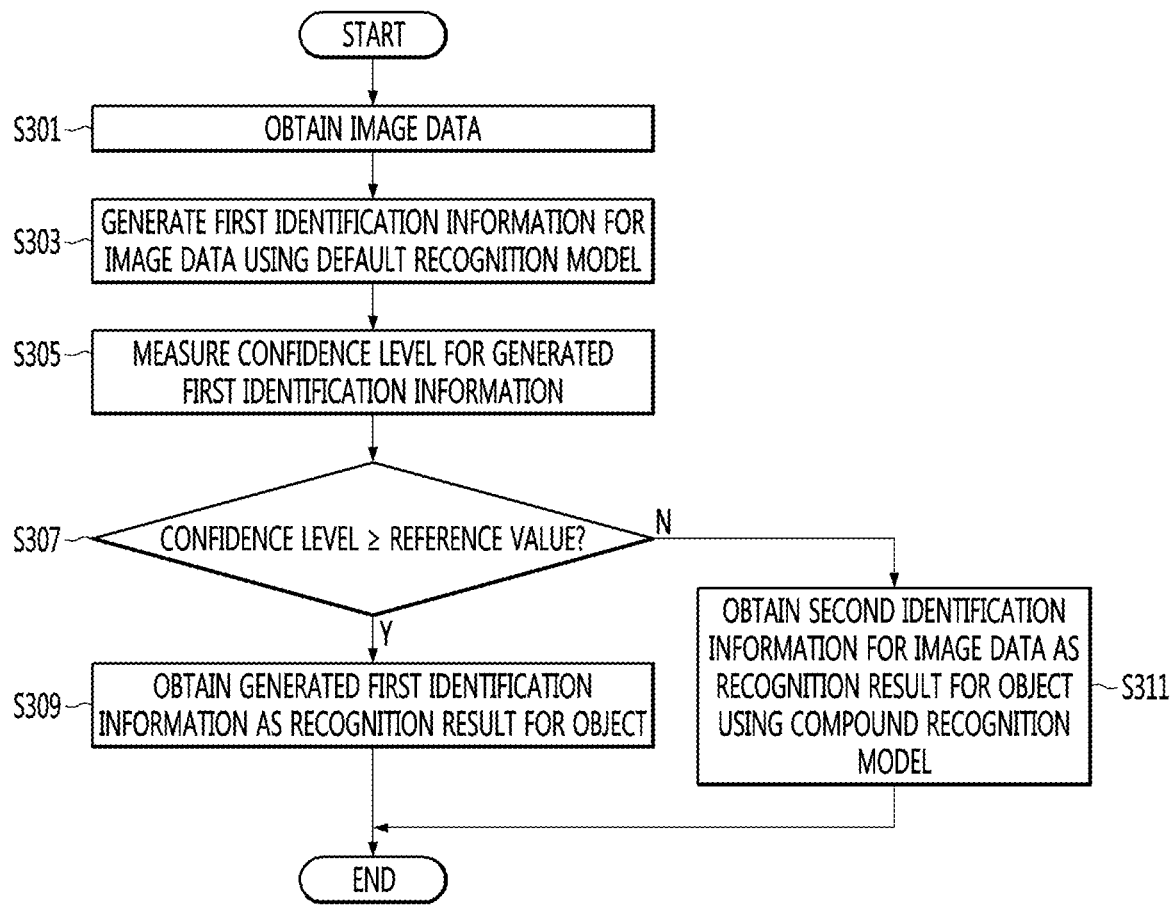
FIG. 3 is a flowchart of a method of recognizing a user's speech according to an embodiment of the present invention.

FIG. 3 is a flowchart of a method of recognizing a user's speech according to an embodiment of the present invention.

Referring to FIG. 3, a processor 180 of the artificial intelligence device 100 obtains image data (S301).

The image data may include an object as an object to be recognized and identified from the image data in the artificial intelligence apparatus 100.

For example, when the artificial intelligence apparatus 100 is a face recognition apparatus, the image data may include a face of a person.

The image data may include at least one object to be identified, but may not include any object to be identified.

The processor 180 may obtain image data photographed by a camera 121 of an input unit 120, or may obtain image data photographed by an external camera (not shown) through a wireless communication unit 110.

The image data may be composed of at least one of RGB image data, IR image data, or depth image data. Therefore, one image data for identifying an object may include all of the RGB image data, the IR image data, and the depth image data.

The camera 121 or an external camera (not shown) used to obtain the image data may include at least one of an RGB sensor, an IR sensor, or a depth sensor.

An example of a camera having a depth sensor is a Time of Flight (ToF) camera.

Although not described in detail, the processor 180 may obtain color information of each pixel from the obtained image data using a color filter format.

The processor 180 generates first identification information corresponding to an object from the obtained image data by using a default recognition model composed of at least one or more of a plurality of recognition models (S303).

Here, identification information for the image data may mean identification information corresponding to an object included in the image data.

Here, the plurality of recognition models refer to models for recognizing and identifying an object included in the image data, and may be stored in a memory 230 of a learning server 200.

The default recognition model is composed of one or more recognition models, and may be defined by a weight (first weight) for each of the plurality of recognition models.

The first identification information corresponding to the object may mean result information associated with recognition and identification of the object included in the image data.

Here, the first identification information may include at least one or more of a type, a size, a color, a position, or an area in the image data of a target object.

For example, first identification information to be generated from image data obtained by photographing a frog includes contents indicating the frog when it is preferably recognized and identified.

Here, each of the recognition models may include recognition models learned using image data sets classified into at least one or more categories according to a photographing environment.

Here, the photographing environment may include at least one of a daytime environment, a nighttime environment, an outdoor environment, or an indoor environment.

Here, the image data set may include an RGB image data set, an IR image data set, a depth image data set, or a combination thereof.

For example, the recognition models may include a recognition model learned using an RGB image data set photographed in a daytime environment, a recognition model learned using an IR image data set photographed in a daytime environment, or recognition model learned using a depth image data set photographed in a daytime environment.

Each recognition model may refer to a recognition model learned using a machine learning algorithm or a deep learning algorithm.

Each recognition model may be composed of artificial neural networks.

Here, when one recognition model is composed of several recognition models, weight information of each recognition model may be included.

That is, generating identification information using a plurality of recognition models may mean multiplying the identification information generated from the same image data with respect to each of the recognition models by weights for the respective recognition models, and adding the identification information which has been multiplied by the weights to generate a new identification information.

For example, the first identification model determines a probability that a recognized object is a first object as 60%, the second identification model determines a probability that the recognized object is the first object as 90%, and the third identification model determines a probability that the recognized object is the first object as 50%, and when the weights between the three identification models are [0.3, 0.5, 0.2], the three identification models determine the probability that the recognized object is the first object as 73% (=60%*0.3+90%*0.5+50%*0.2).

In the above example, when the default recognition model is set to recognize the object in a case where a recognition probability is 70% or more, the default recognition model may generate first identification information indicating that the recognized object is the first object.

Here, the default recognition model may be determined as a default weight for each model.

The processor 180 measures a confidence level for the first identification information generated using the default recognition model (S305).

Measuring the confidence level of the generated first identification information may mean measuring the uncertainty of the generated first identification information.

The confidence level or uncertainty may be used as an index for determining whether the first identification information generated by the default recognition model is reliable.

Here, the processor 180 may measure the confidence level or uncertainty using a dropout technique with respect to the default recognition model composed of artificial neural networks.

Here, the processor 180 may measure the confidence level or uncertainty through perturbation in the image data.

The processor 180 determines whether the measured confidence level is equal to or greater than a reference value (S307).

When the measured confidence level is greater than or equal to the reference value, it may mean that the first identification information generated by the default recognition model with respect to the image data has a high confidence level.

Here, the reference value may be a preset value.

For example, the reference value may be 50%, but the present invention is not limited thereto.

If the measured confidence level is greater than or equal to the reference value as a result of the determination in step S307, the processor 180 obtains the generated first identification information as a recognition result for the object (S309).

Obtaining the first identification information as the recognition result for the object may mean providing the first identification information as the recognition result for the object.

The processor 180 may output the generated first identification information through the output unit 150.

Here, the processor 180 may provide the generated first identification information to an external device (not shown) that requires the generated first identification information through the wireless communication unit 110.

Here, the processor 180 may provide the generated first identification information to a program requiring the generated first identification information.

If the measured confidence level is less than the reference value as a result of the determination in step S307, the processor 180 obtains second identification information for the image data as a recognition result for the object using a compound recognition model (S311).

Obtaining the second identification information as the recognition result for the object may mean providing the second identification information as the recognition result for the object.

Here, the compound recognition model may be composed of at least one or more of a plurality of recognition models.

The compound recognition model may be regarded as using the recognition models constituting the compound recognition model.

Here, the compound recognition model may refer to a model capable of recognizing an object with a high confidence level compared to the default recognition model with respect to the obtained image data.

Here, the processor 180 may analyze a feature of the input image data to construct a compound recognition model suitable for the input image data, and generate second identification information corresponding to the input image data using the constructed compound recognition model.

A detailed method of constructing the compound recognition model will be described later with reference to FIG. 9.

As described above, the present invention may recognize and identify an object with higher accuracy in image data using a plurality of recognition models learned using various environments and various image data sets.

Figure 4:
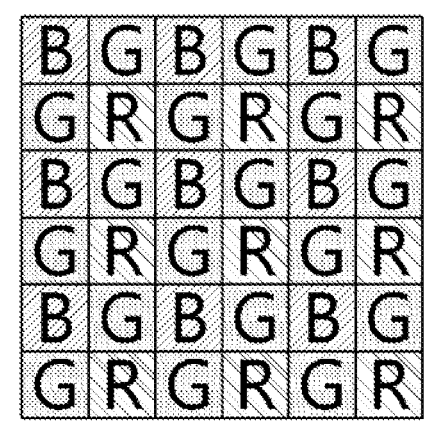

FIG. 4 is a view illustrating an example of a color filter format of RGB image data according to an embodiment of the present invention.

The color filter format of the RGB image data may be referred to as a Bayer format.

Referring to FIG. 4, in the color filter format for RGB image data, four pixels of 2×2 form constitute one unit, and each unit includes one pixel of red (R) (red), two pixels of green (G), and one pixel of blue (B).

Because G has about two times the effect on brightness than R or B, and the human eye is sensitive to brightness, the Bayer format for RGB image data includes G twice as much as R and B.

Here, G may be disposed diagonally within each unit.

As each unit is repeated, the pixels representing R and B are equally spaced by 2 pixels, both horizontally and vertically. As each unit is repeated, the pixels representing G have the same spacing with a diagonal grid pattern.

Figure 5:
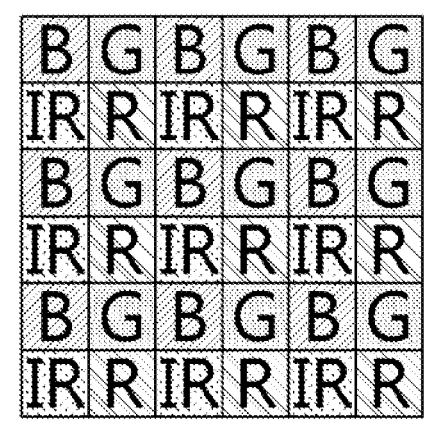

FIG. 5 is a view illustrating an example of a color filter format of RGB-IR image data according to an embodiment of the present invention.

Here, the RGB-IR image data may refer to image data including RGB image data and IR image data.

The color filter format of the RGB-IR image data may be referred to as an RGB-IR format.

Referring to FIG. 5, in the color filter format for RGB-IR image data, four pixels of 2×2 form constitute one unit, and each unit includes one pixel of R, one pixel of G, one pixel of B, and one pixel of IR.

As each unit is repeated, the pixels representing R, G, B, and IR have equal spacing of 2 pixels, both horizontally and vertically.

FIG. 6 is a view illustrating a dropout technique in an artificial neural network.

As shown in FIG. 6, the dropout technique is a technique used to prevent overfitting of an artificial neural network, and may mean to determine a result in the state of arbitrarily excluding nodes constituting the artificial neural network.

In FIG. 6, (a) shows an example of a recognition model constituting a default recognition model, and all nodes are all connected.

In FIG. 6, (b) shows a state in which arbitrary nodes are excluded using a dropout technique for the artificial neural network model of (a).

Figure 7:
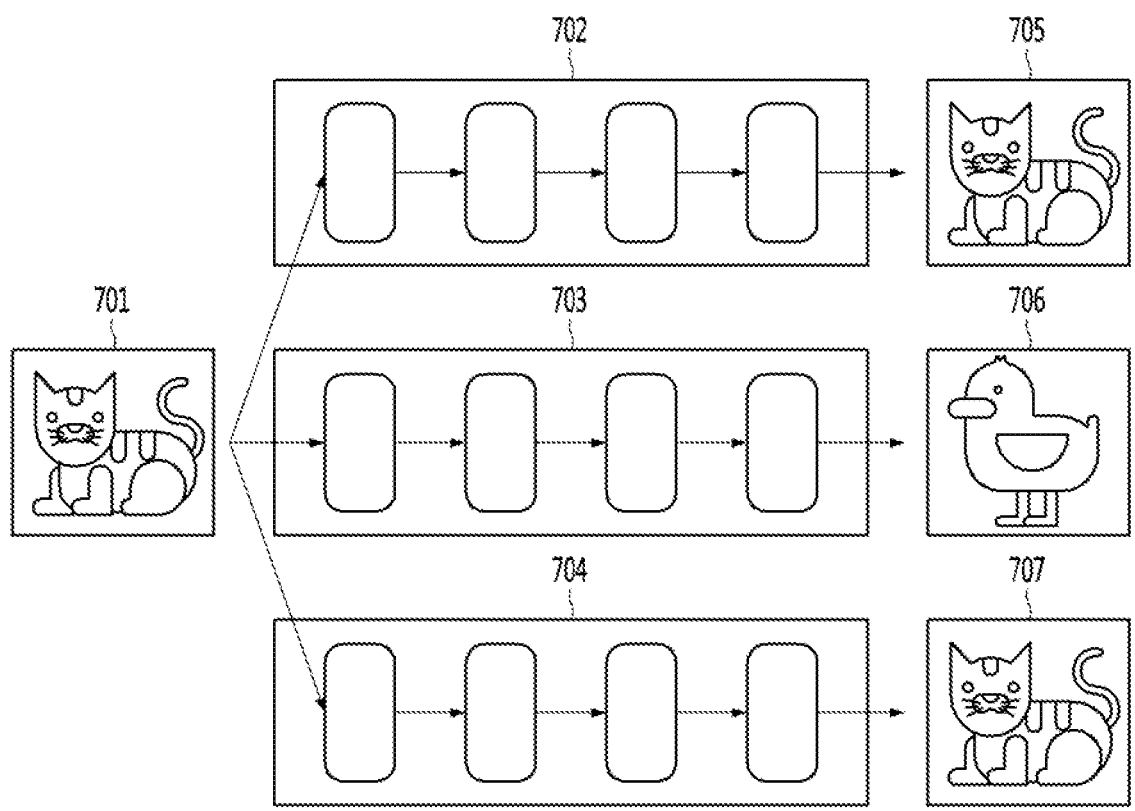
FIG. 7 is a view illustrating a method of measuring a confidence level of a default recognition model using a dropout technique in an embodiment of the present invention.

FIG. 7 is a view illustrating a method of measuring a confidence level of a default recognition model using a dropout technique in an embodiment of the present invention.

Referring to FIG. 7, according to an embodiment of the present invention, when image data 701 for object recognition is inputted, the processor 180 may generate a plurality of default recognition models 702, 703 and 704, which are dropped out using the dropout technique and generate dropout-based identification information 705, 706 and 707 for the image data 701 using the dropped-out default recognition models 702, 703 and 704.

In addition, the processor 180 may determine a confidence level for a default recognition confidence level using the number of pieces of dropout-based identification information corresponding to the identification information generated by the default recognition models among all of the generated dropout-based identification information 705, 706, and 707.

For example, it is assumed that the image data 701 is an image including a cat, and the default recognition model generates identification information indicating that an object included in the image data 701 is a cat. Also, it is assumed that, when the dropout-based pieces of identification information 705, 706, and 707 are generated using the three dropped-out default recognition models 702, 703, and 704, two pieces of dropout-based identification information 705 and 707 indicate that an object is a cat similarly as the identification information generated by the default recognition model. In this case, the processor 170 may determine the confidence level of the identification information generated by the default recognition model as 66%.

Although only three dropped-out default recognition models are shown in FIG. 7, this is merely an example. That is, the confidence level of the identification information generated by the default recognition models may be measured (determined) using a larger number of (e.g., 100) dropped-out default recognition models.

As a result of generating the dropout-based identification information using the 100 dropped-out default recognition models, when 80 pieces of dropout-based identification information are the same as the identification information generated using the default recognition model, the processor 180 may determine a confidence level of the generated identification information as 80%.

Here, the processor 180 may determine a confidence level of the identification information generated by using at least one or more of the average or variance of the number of pieces of dropout-based identification information that are identical to the identification information generated using the default recognition model of all of the pieces of dropout-based identification information.

Figure 8:
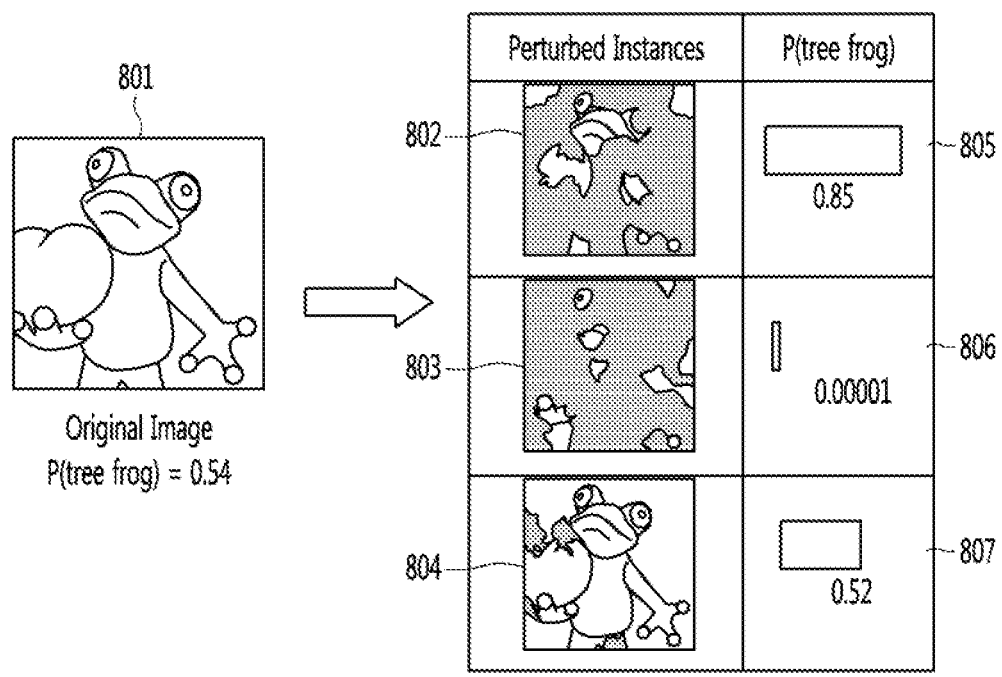
FIG. 8 is a view illustrating a method of measuring a confidence level through perturbation for image data according to an embodiment of the present invention.

FIG. 8 is a view illustrating a method of measuring a confidence level through perturbation for image data according to an embodiment of the present invention.

Referring to FIG. 8, according to an embodiment of the present invention, when an image 801 for object recognition is inputted, the processor 180 may generate changed image data 802, 803, and 804 using random noise for the image data, and generate perturbation-based identification information 805, 806, and 807 for each of the changed image data 802, 803, and 804 generated using the default recognition model.

Then, the processor 180 may determine the confidence level for the basic recognition reliability using the number of pieces of dropout-based identification information corresponding to identification information generated by the default recognition model among all of the generated perturbation-based identification information 805, 806, and 807.

For example, it is assumed that the image data 801 is an image including a tree frog, and the default recognition model determines the probability that an object included in the image data 801 is a tree frog as a probability of 54% and generates identification information indicating that the object included in the image data 801 is a tree frog. Also, it is assumed that when the perturbation-based identification information 805, 806, and 807 are generated for the three pieces of changed image data 802, 803, and 804 using the default recognition model, the two pieces of perturbation-based identification information 805 and 807 indicate the tree frog with a probability of 50% or more, like the identification information generated for the image data 801. In this case, the processor 170 may determine the confidence level of the identification information generated by the default recognition model as 66%.

In FIG. 8, only three changed image data are presented, but this is merely an example. That is, the confidence level of the identification information generated by the default recognition model may be measured (determined) by using a larger number (e.g., 100) of changed image data.

When the perturbation-based identification information is generated using 100 pieces of changed image data, and 80 pieces of perturbation-based identification information are identical to the identification information for the image data, the processor 180 may determine the confidence level of the generated identification information as 80%.

Here, the processor 180 may determine the confidence level of the generated identification information using at least one or of an average or a variance of the number of pieces of perturbation-based identification information that are identical to the identification information for the image data among all the perturbation-based identification information.

Figure 9:
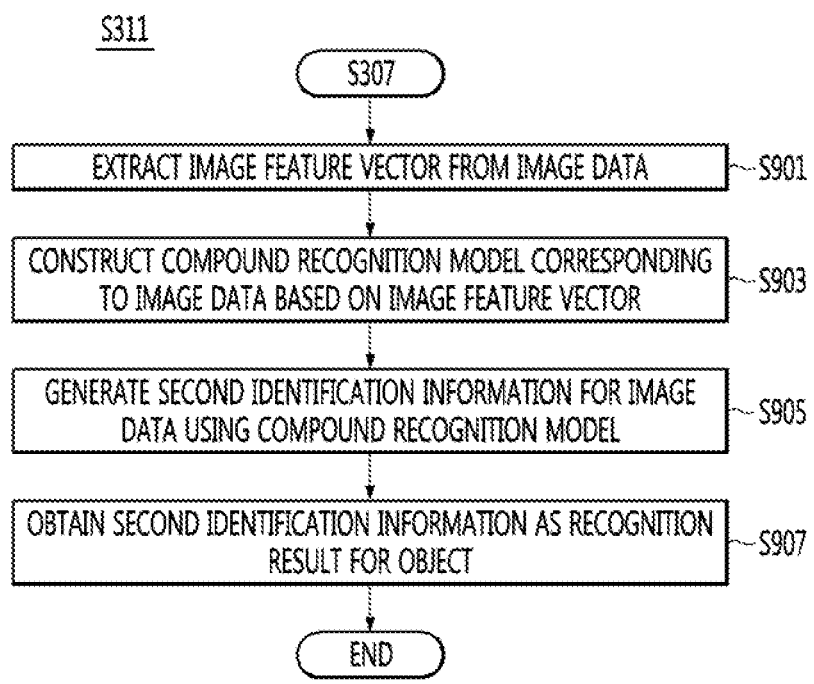
FIG. 9 is a flowchart illustrating an example of a step (S311) of generating second identification information illustrated in FIG. 3.

FIG. 9 is a flowchart illustrating an example of a step (S311) of generating second identification information illustrated in FIG. 3.

Referring to FIG. 9, the processor 180 extracts an image feature vector from obtained image data (S901).

The image feature vector includes at least one image feature representing a feature of the obtained image data.

Here, the image feature vector may include at least one of brightness, saturation, illuminance, hue, a noise level, a blur level, frequency-based feature, an energy level, or depth as an image feature.

Here, the frequency-based feature may include at least one of an edge, a shape, or a texture.

Here, the frequency-based feature may be obtained through Fourier transformation from image data, an edge and a shape may be obtained in a high frequency region, and a texture may be obtained in a low frequency region.

Here, the frequency-based feature may be extracted using an image pyramid network.

Here, the image feature vector may include red (R), green (G), and blue (B) features for color according to the RGB model, hue, saturation, and value according to the HSV model, and brightness (Y) and color difference (Cb, Cr) according to the YCbCr model (YUV model).

The processor 180 constructs a compound recognition model for recognizing an object in the obtained image data based on the image feature vector (S903).

The compound recognition model may be defined by a weight (second weight) for each of a plurality of recognition models.

Here, constructing the compound recognition model may mean determining a weight for each of the plurality of recognition models.

Here, a weight (the second weight) for determining the compound recognition model may be referred to as a compound weight.

That is, the compound recognition model may be defined by a compound weight.

Here, the processor 180 generally determines the compound weight to be a value different from the default weight, but may be determined to be the same as the default weight in some situations.

For example, when the optimal weight is the default weight with respect to the obtained image data, the compound weight may be set to be the same as the default weight.

Here, the compound weight may be determined using a weight determination model.

The weight determination model may mean a model that outputs a compound weight constituting a compound recognition model that is expected to identify an object with a high confidence level in image data corresponding to a corresponding image feature vector when the image feature vector is inputted.

Alternatively, the weight determination model may mean a model that outputs a compound weight constituting a compound recognition model that is expected to identify an object with a certain confidence level or more in image data corresponding to a corresponding image feature vector when the image feature vector is inputted.

The weight determination model may be an artificial neural network learned using a machine learning algorithm or a deep learning algorithm.

Here, the weight determination model may be learned using training data.

The training data may include an image feature vector and a compound weight labeled corresponding thereto.

For example, when the brightness included in the training data is equal to or greater than a predetermined level, the weight of a nighttime RGB recognition model may be labeled to be lower than the weight of a daytime RGB recognition model.

Similarly, for example, with respect to an image feature vector extracted from image data photographed in a dark environment, a weight of the IR recognition model may be labeled to be higher than a weight of the daytime RGB recognition model.

In general, since an IR image or a depth image may be expected to have a higher object recognition rate than the RGB image in a dark environment, a weight of an IR recognition model and a depth recognition model may be labeled such that the weight thereof is relatively high compared to other recognition models with respect to a image feature vector corresponding to image data photographed in the dark environment.

When an image feature vector included in the training data is inputted to an input layer, the weight determination model may be learned such that a compound weight output from an output layer has a smaller error with the labeled compound weight included in the training data.

That is, the weight determination model may be learned such that when the image feature vector corresponding to the image data is inputted, the output compound weight follows the labeled compound weight.

Here, the weight determination model may be a regression model.

The weight determination model may be learned in the processor 180, but may be learned in the running processor 240 of the learning apparatus 200.

Here, the weight determination model may be stored in the memory 170.

The training data for training the weight determination model may include labeling information of compound weights of the complex recognition model that maximizes a confidence level of identification information generated from the training image data.

For example, the training data corresponding to specific training image data includes an image feature vector and a compound weight corresponding to the specific training image data as labeling information. The confidence level of the identification information generated by the compound recognition model defined by the compound weight may be expected to be higher than the confidence level of the identification information generated by the compound recognition model defined by the other compound weights.

In other words, the processor 180 may construct a compound recognition model capable of recognizing and identifying an object with high accuracy by setting the weight of a recognition model capable of accurately recognizing and identifying an object included in image data to be relatively high as compared with those of other recognition models with respect to given image data.

The processor 180 generates second identification information for obtained image data by using the constructed compound recognition model (S905).

Here, identification information for the image data may mean identification information corresponding to an object included in the image data.

As described with respect to the default recognition model, generating the identification information by using the compound recognition model composed of a plurality of recognition models may mean multiplying the third identification information generated from the same image data with respect to each of the recognition models by weights for the respective recognition models, and adding the third identification information which has been multiplied by the weights to generate a second identification information.

For example, the first identification model determines a probability that a recognized object is a first object as 60%, the second identification model determines a probability that the recognized object is the first object as 90%, and the third identification model determines a probability that the recognized object is the first object as 50%, and when the weights between the three identification models are [0.2, 0.7, 0.1], the three identification models determine the probability that the recognized object is the first object as 80% (=60%*0.2+90%*0.7+50%*0.1).

In the above example, when the compound recognition model is set to recognize the object in a case where a recognition probability is 70% or more, the compound recognition model may generate second identification information indicating that the recognized object is the first object.

Since the processor 180 generates the second identification information by constructing the compound recognition model when the confidence level of the first identification information is low, it is expected that the first identification information and the second identification information are different from each other. However, a case where the first identification information is identical to the second identification information may also occur sufficiently.

The processor 180 obtains the generated second identification information as a recognition result for the object (S907).

Obtaining the second identification information as the recognition result for the object may mean providing the second identification information as the recognition result for the object.

The processor 180 may output the generated second identification information through the output unit 150.

Here, the processor 180 may provide the generated second identification information to an external device (not shown) that requires the generated second identification information through the wireless communication unit 110.

The processor 180 may provide the generated second identification information to a program requiring the generated second identification information.

Figure 10:
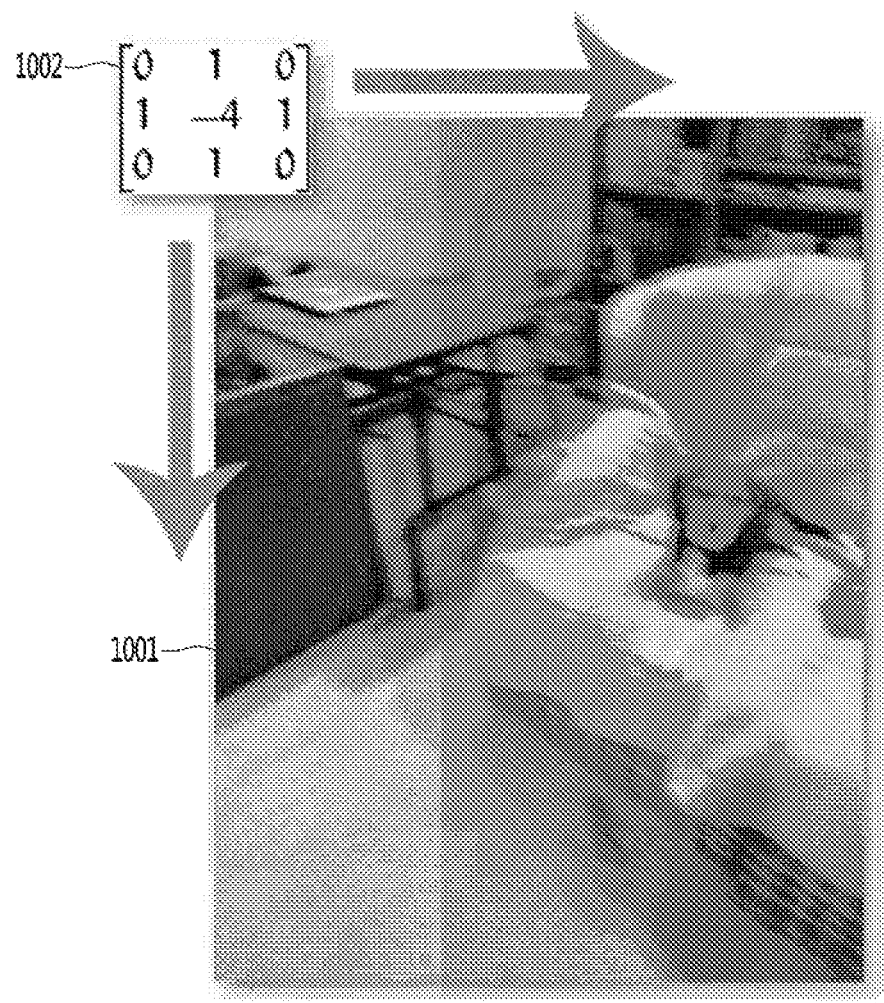
FIGS. 10 and 11 are views illustrating a method of extracting a blur level as an image feature from image data according to an embodiment of the present invention.
Figure 11:
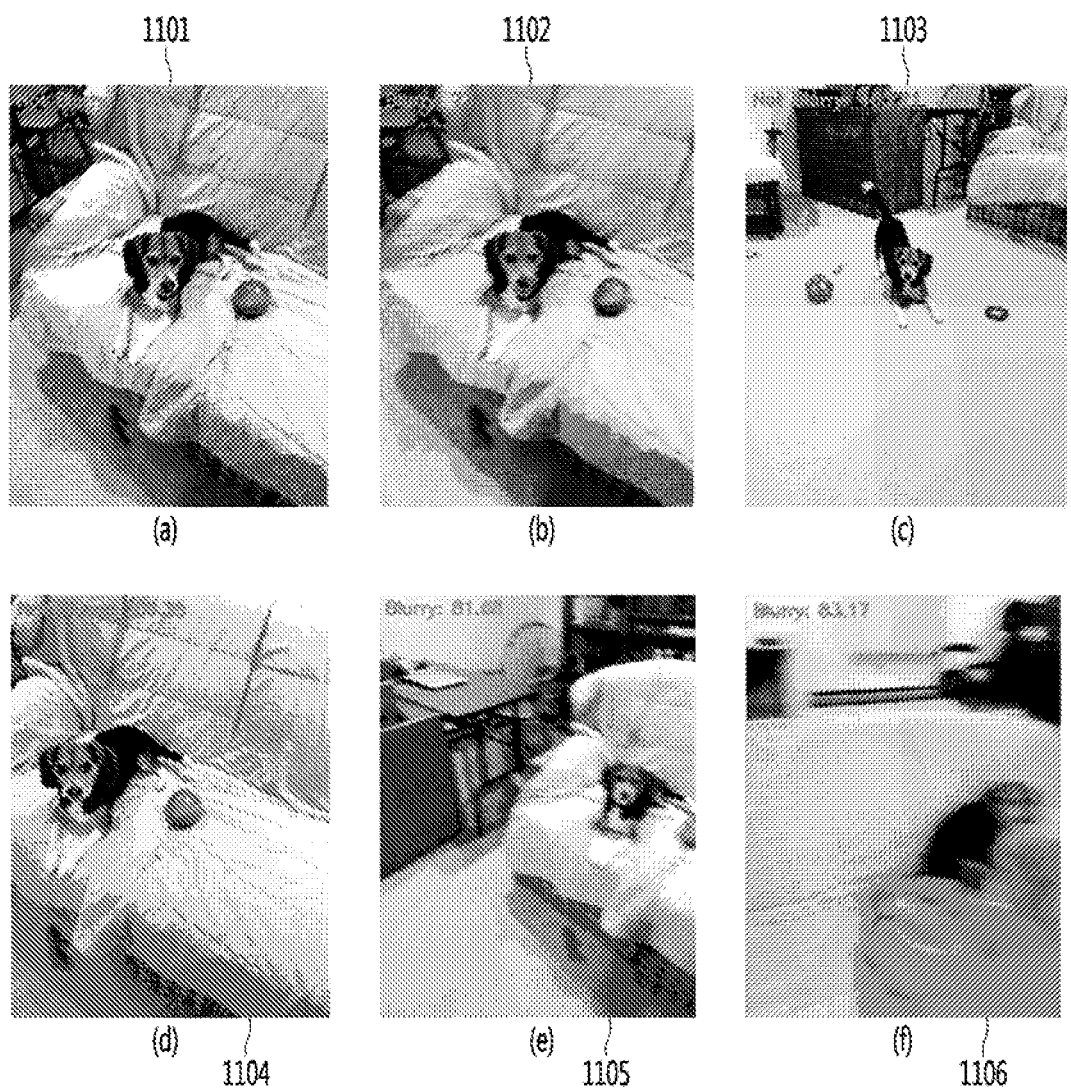

FIGS. 10 and 11 are views illustrating a method of extracting a blur level as an image feature from image data according to an embodiment of the present invention.

Referring to FIG. 10, an embodiment of the present invention is a method of extracting a blur level from image data, and the processor 180 may calculate a Laplacian using a Laplace kernel 1002 with respect to the image data 1001 and calculate and use the variance of the Laplacian as the blur level.

Here, the higher the variance (blur level) of Laplacian, the clearer the image data, and the lower the variance (blur level) of Laplacian, the image data is more blur.

The processor 180 may determine that the image data is clear when the blur level is equal to or higher than a predetermined level.

Referring to FIG. 11, the processor 180 may determine the blur level of image data 1101 of (a) to be 307.45, the blur level of image data 1102 of (b) to be 73.77, the blur level of image data 1103 of (c) to be 463.21, the blur level of image data 1104 of (d) to be 206.35, the blur level of image data 1105 of (e) to be 81.68, and the blur level of image data 1106 of (f) to be 83.17.

FIG. 12 is a view illustrating an example of image features included in an image feature vector, according to an embodiment of the present invention.

FIG. 12 shows an example of image features that may be included in an image feature vector according to an embodiment of the present invention, and the image features as shown in FIG. 12 may be selectively included in an image feature vector.

That is, although all the image features shown in FIG. 12 may be included in the image feature vector, all the image features shown in FIG. 12 may not be included in the image feature vector.

FIG. 13 is a view illustrating an example of image data according to an embodiment of the present invention.

Referring to FIG. 13, the image data according to an embodiment of the present invention may include RGB image data 1301 including only RGB information as shown in (a), IR image data 1302 including only IR information as shown in (b), and image data 1303 including only depth information as shown in (c), or image data (not shown) composed of a combination thereof.

Figure 14:
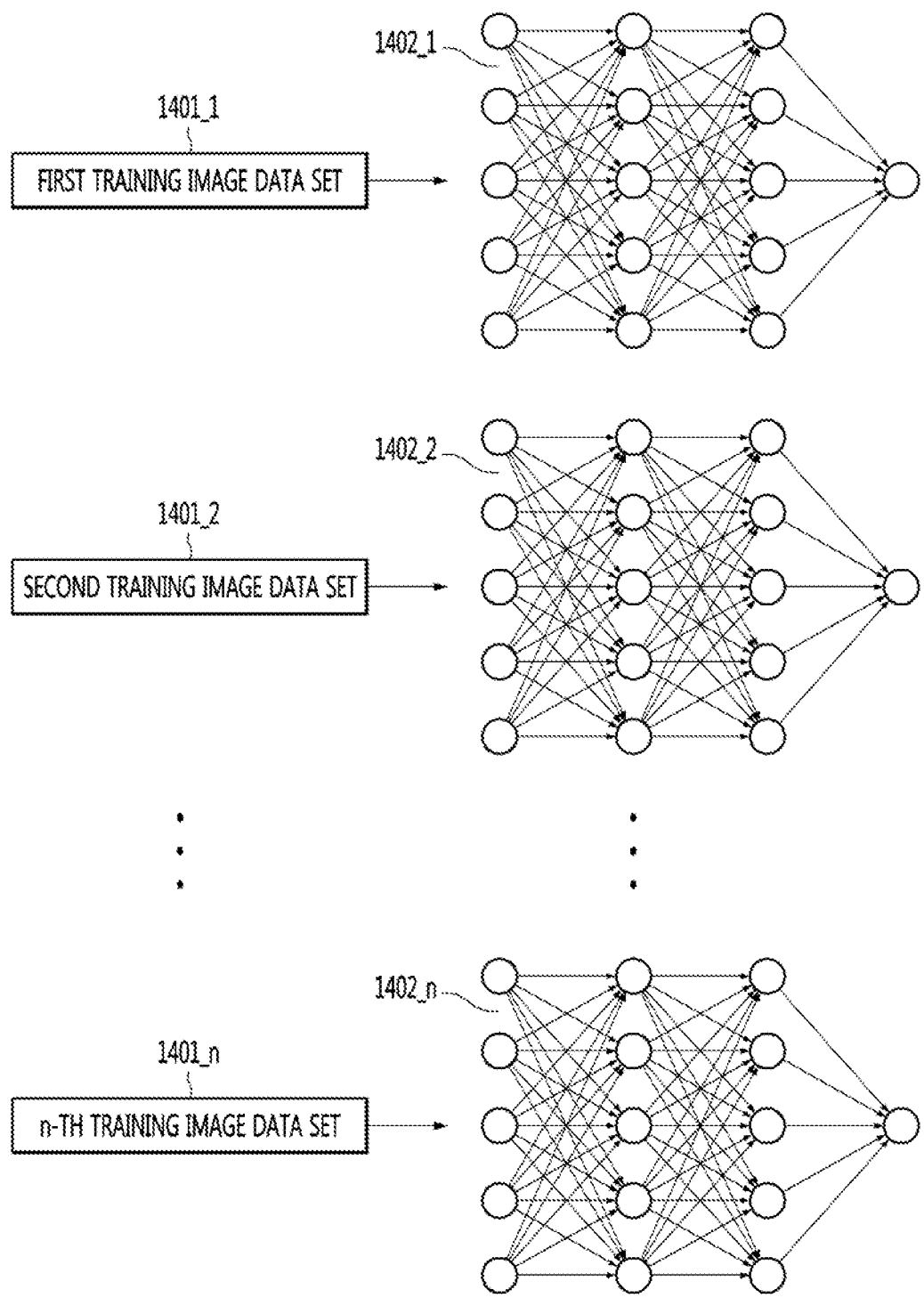
FIG. 14 is a view illustrating a plurality of recognition models according to an embodiment of the present invention.

FIG. 14 is a view illustrating a plurality of recognition models according to an embodiment of the present invention.

Referring to FIG. 14, a plurality of recognition models 1402_1 and 1402_2 to 1402_n according to an embodiment of the present invention are trained using respective corresponding training image data sets 1401_1 and 1401_2 to 1401_n.

Here, each of the training image data sets 1401_1, 1401_2 to 1401_n may be classified based on an image type such as RGB information, IR information, or depth information.

For example, a first training image data set is constructed from image data including only RGB information, a second training image data set is constructed from image data including only IR information, and a third training image data set is constructed from image data including only depth information. A fourth training image data set is constructed from image data including only RGB information and IR information, and other training image data sets may be constructed in a smiler manner.

Each of the training image data sets 1401_1 and 1401_2 to 1401_n may be classified based on environment information in which image data is photographed.

For example, the first training image data set is constructed from only image data photographed in a daytime environment, the second training image data set is constructed from only image data photographed in a nighttime environment, the third training image data set is constructed from only image data photographed in sunny weather, the fourth training image data set is constructed from only of image data photographed in rainy weather, and other training image data sets may be constructed in a smiler manner.

The photographed environment information may include time zone information, weather information, season information, place information, and the like.

The time zone information may include daytime, nighttime, and the like.

The weather information may include sunny weather, rainy weather, snowy weather, cloudy weather, and the like.

The season information may include spring, summer, autumn and winter.

The place information may include indoor, outdoor, underwater, and the like.

Figure 15:
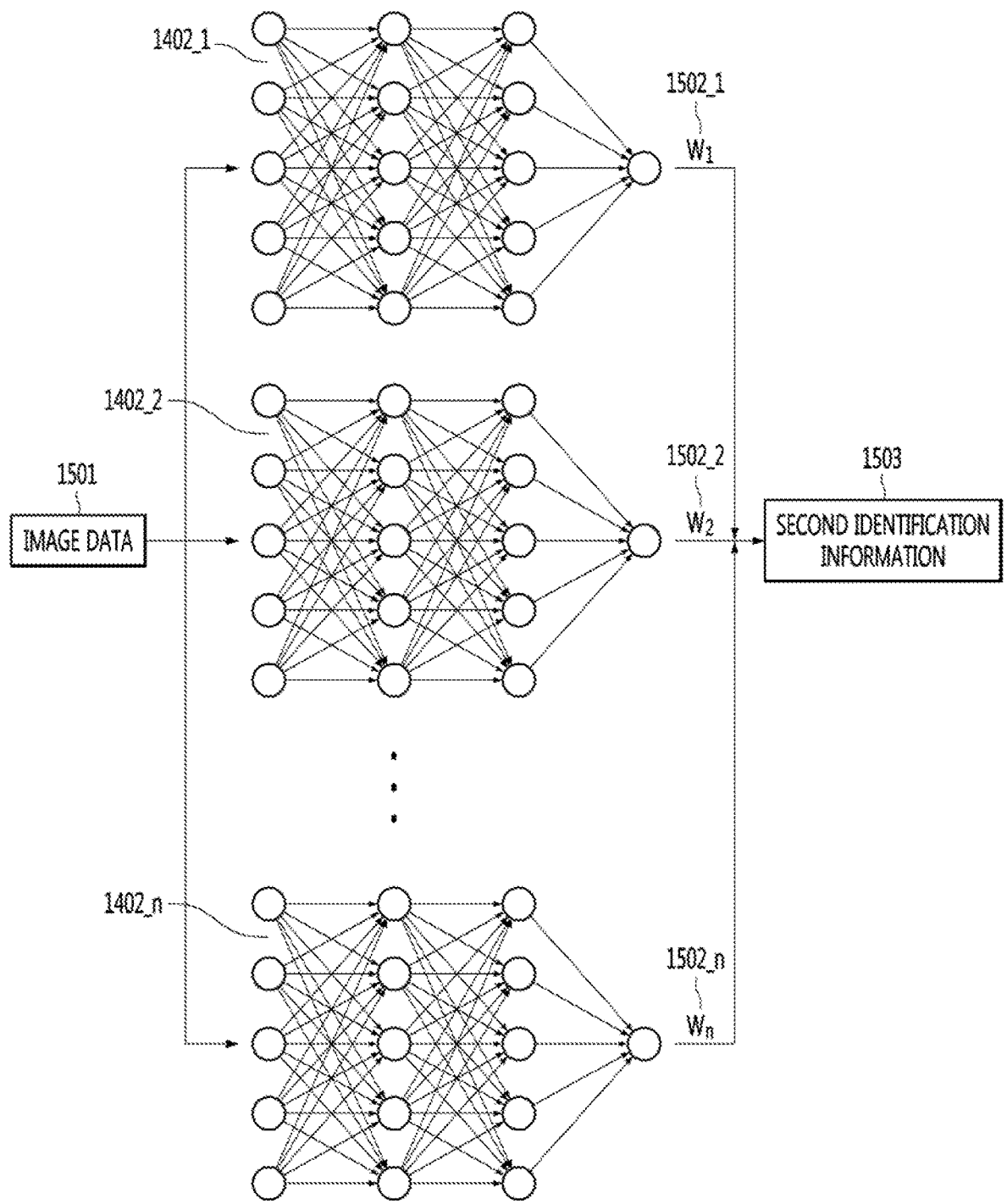
FIG. 15 is a view illustrating a method of generating second identification information using a compound recognition model according to an embodiment of the present invention.

FIG. 15 is a view illustrating a method of generating second identification information using a compound recognition model according to an embodiment of the present invention.

Referring to FIG. 15, a compound recognition model according to an embodiment of the present invention includes a plurality of recognition models 1402_1 and 1402_2 to 1402_n and compound weights 1502_1 and 1502_2 to 1502_n for the respective recognition models.

When obtaining the image data 1501, the processor 180 may obtain third identification information outputted from each of the compound recognition models 1402_1, 1402_2 to 1402_n by inputting the obtained image data 1501 to each of the compound recognition models which are learned.

In addition, the processor 180 may generate second identification information based on the third identification information outputted from the complex recognition models 1402_1 and 1402_2 to 1402_n and the compound weights 1502_1 and 1502_2 to 1502_n for the respective recognition models.

According to an embodiment of the present invention, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus for recognizing at least one object, the apparatus comprising:
a memory configured to store a plurality of recognition models for generating identification information corresponding to the at least one object from image data; and
a processor configured to:
obtain image data for the at least one object,
generate first identification information corresponding to the at least one object from the image data using a default recognition model composed of one or more of the plurality of recognition models,
measure a confidence level for the first identification information,
obtain the first identification information as a recognition result of the at least one object if the confidence level is equal to or greater than a first reference value, and
obtain second identification information corresponding to the at least one object from the image data as a recognition result of the at least one object using a compound recognition model composed of one or more of the plurality of recognition models if the measured confidence level is less than the first reference value, wherein the default recognition model is a model defined by first weights for the plurality of recognition models,
wherein the compound recognition model is a model defined by second weights for the plurality of recognition models, and
wherein based on the measured confidence level being less than the first reference value, the processor is configured to determine the second weights corresponding to each of the plurality of recognition models based on an image feature vector extracted from the image data and construct the compound recognition model using the second weights.

2. The artificial intelligence apparatus of claim 1, wherein the processor is further configured to generate the second identification information from the image data using the compound recognition model.

3. The artificial intelligence apparatus of claim 1, wherein the processor is further configured to:
generate a plurality of pieces of third identification information respectively corresponding to the at least one object using the plurality of recognition models by utilizing the compound recognition model, and
generate the second identification information based on the generated plurality of pieces of third identification information and the second weights.

4. The artificial intelligence apparatus of claim 3, wherein the processor is further configured to determine the second weights corresponding to the image feature vector using a weight determination model,
wherein the weight determination model is a model for outputting weights constituting the compound recognition model expected to generate identification information having a predetermined confidence level or more when an arbitrary image feature vector is inputted.

5. The artificial intelligence apparatus of claim 4, wherein the plurality of recognition models include recognition models learned using image data sets classified into one or more categories based on at least one or more of environment information or an image type,
wherein the environment information includes at least one or more of time zone information, weather information, season information, or place information, and
wherein the image type includes an RGB image, an IR image, a depth image, or a combination thereof.

6. The artificial intelligence apparatus of claim 5, wherein the plurality of recognition models include at least one or more of a daytime RGB recognition model learned with an RGB image data set obtained in a daytime environment, a nighttime RGB recognition model learned with an RGB image data set obtained in a nighttime environment, a daytime IR recognition model learned with an image data set obtained in a daytime environment, a nighttime IR recognition model learned with an IR image data set obtained in a nighttime environment, or a depth recognition model learned with a depth image data set.

7. The artificial intelligence apparatus of claim 6, wherein if based on a brightness corresponding to the image data being equal to or greater than a second reference value, the processor is further configured to set a weight for the daytime RGB recognition model to be higher than a weight for the nighttime RGB recognition model.

8. The artificial intelligence apparatus of claim 4, wherein the weight determination model is learned using training data through a machine learning algorithm or a deep learning algorithm, and wherein the training data includes a training image feature vector, and the second weight corresponding to the training image feature vector as labeling information.

9. The artificial intelligence apparatus of claim 8, wherein the weight determination model is learned to minimize an error between an output when the training image feature vector is inputted and the labeling information.

10. The artificial intelligence apparatus of claim 1, wherein each of the plurality of recognition models is a recognition model learned through a machine learning algorithm or a deep learning algorithm using different image data sets.

11. The artificial intelligence apparatus of claim 1, wherein the image feature vector includes at least one or more of brightness, saturation, illumination, hue, a noise level, a blur level, a frequency-based feature, an energy level, or depth, and
wherein the frequency-based feature includes at least one or more of an edge, a shape, or a texture.

12. A method of recognizing at least one or more objects, comprising:
obtaining image data for the at least one or more objects;
generating first identification information corresponding to the at least one or more objects from the image data using a default recognition model composed of at least one or more of the plurality of recognition models for generating identification information corresponding to the object from the image data;
measuring a confidence level for generation of the first identification information;
obtaining the first identification information as a recognition result of the at least one or more objects if the measured confidence level is equal to or greater than a first reference value; and
obtaining the second identification information corresponding to the at least one or more objects from the image data as a recognition result of the object using a compound recognition model composed of at least one or more of the plurality of recognition models if the measured confidence level is less than a first reference value,
wherein the default recognition model is a model defined by first weights for each of the plurality of recognition models,
wherein the compound recognition model is a model defined by second weights for each of the plurality of recognition models,
wherein the obtaining of the second identification information comprises:
determining the second weights corresponding to each of the plurality of recognition models based on the image feature vector extracted from the image data and constructing the compound recognition model using the second weights based on the measured confidence level being less than the first reference value.

13. A machine-readable non-transitory medium having stored thereon machine-executable instructions for recognizing at least one or more objects, the instructions comprising:
obtaining image data for the at least one or more objects;
generating first identification information corresponding to the at least one or more objects from the image data using a default recognition model composed of at least one or more of the plurality of recognition models for generating identification information corresponding to the at least one or more objects from the image data;
measuring a confidence level for generation of the first identification information;
obtaining the first identification information as a recognition result of the at least one or more objects if the measured confidence level is equal to or greater than a first reference value; and
obtaining the second identification information corresponding to the at least one or more objects from the image data as a recognition result of the at least one or more objects using a compound recognition model composed of one or more of the plurality of recognition models if the measured confidence level is less than a first reference value,
wherein the default recognition model is a model defined by first weights for each of the plurality of recognition models,
wherein the compound recognition model is a model defined by second weights for each of the plurality of recognition models,
wherein the obtaining of the second identification information comprises:
determining the second weights corresponding to each of the plurality of recognition models based on the image feature vector extracted from the image data and construct the compound recognition model using the second weights if the measured confidence level is less than the first reference value.

* * * * *